Figure 1:
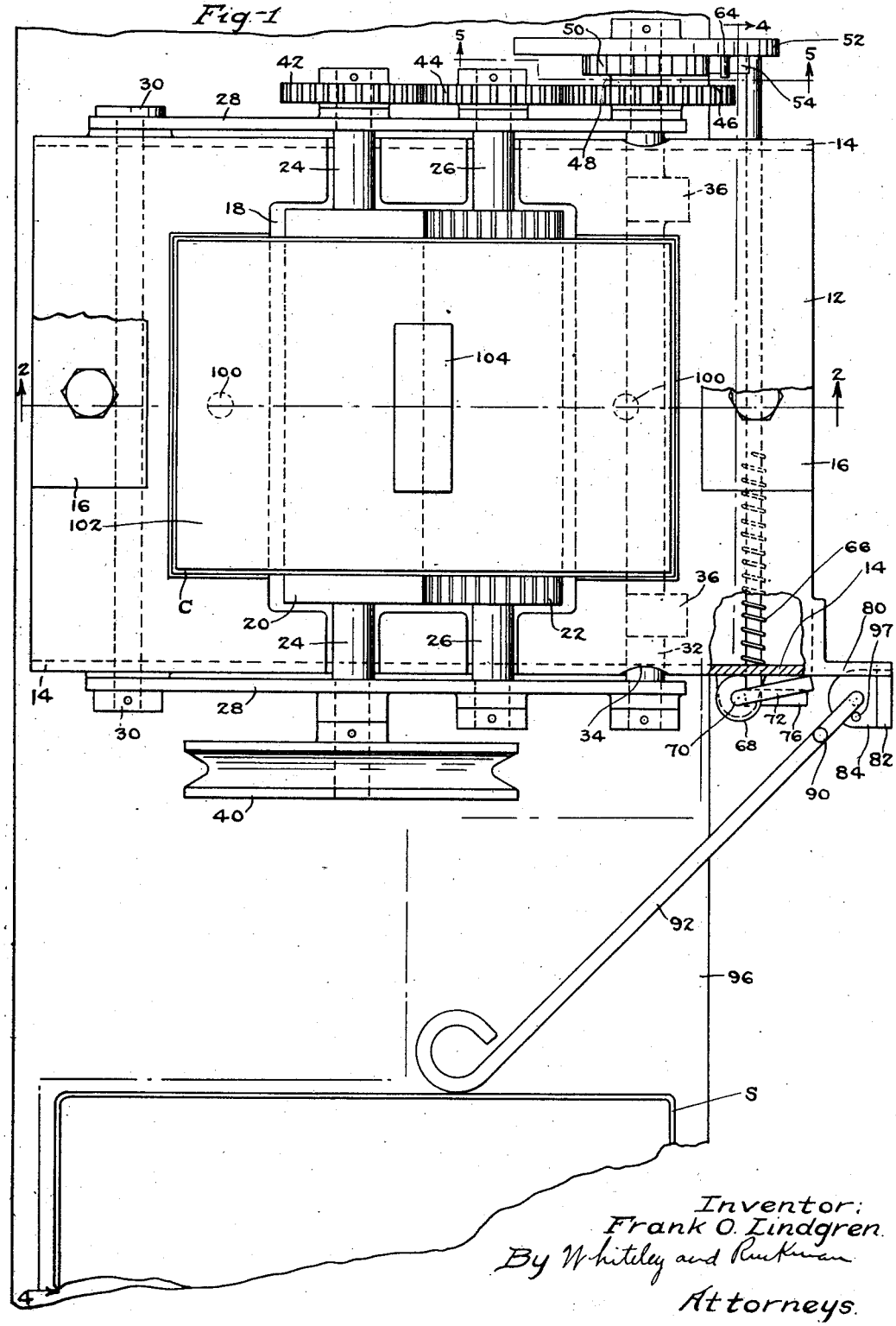

March 15, 1932.  F. O. LINDGREN  1,849,238
MACHINE FOR INSERTING CIRCULARS INTO CONTAINERS
Filed June 29, 1928   3 Sheets-Sheet 1

Inventor:
Frank O. Lindgren
By Whitley and Ruckman
Attorneys.

March 15, 1932.   F. O. LINDGREN   1,849,238
MACHINE FOR INSERTING CIRCULARS INTO CONTAINERS
Filed June 29, 1928   3 Sheets-Sheet 2
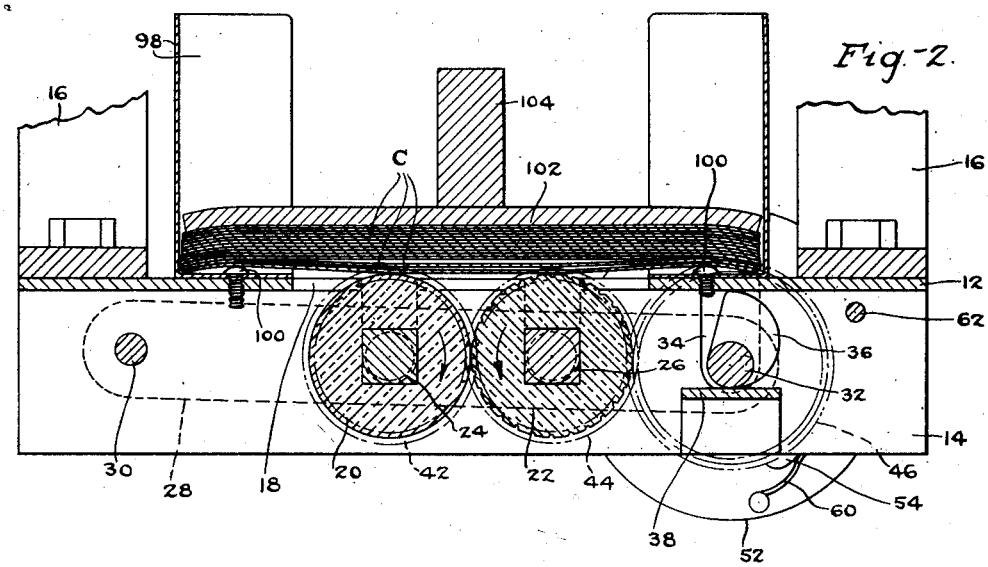
Fig.-2.
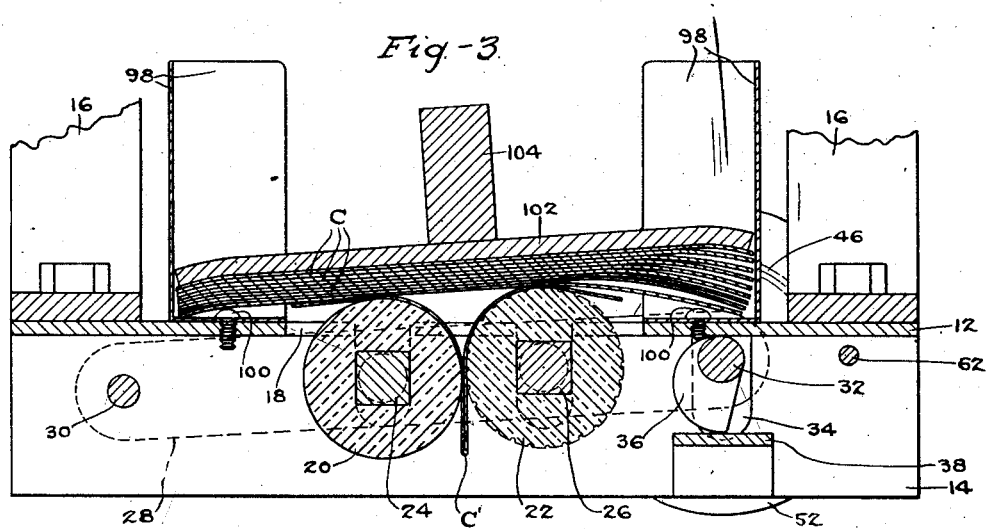
Fig.-3.
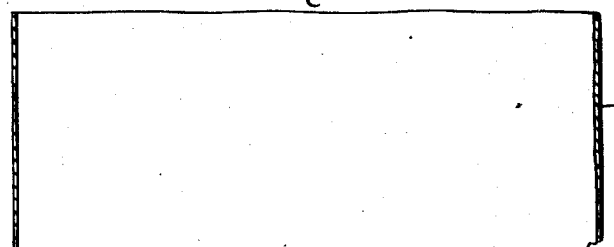
Inventor:
Frank O. Lindgren
By Whiteley and Ruthman
Attorneys.

March 15, 1932. F. O. LINDGREN 1,849,238
MACHINE FOR INSERTING CIRCULARS INTO CONTAINERS
Filed June 29, 1928 3 Sheets-Sheet 3
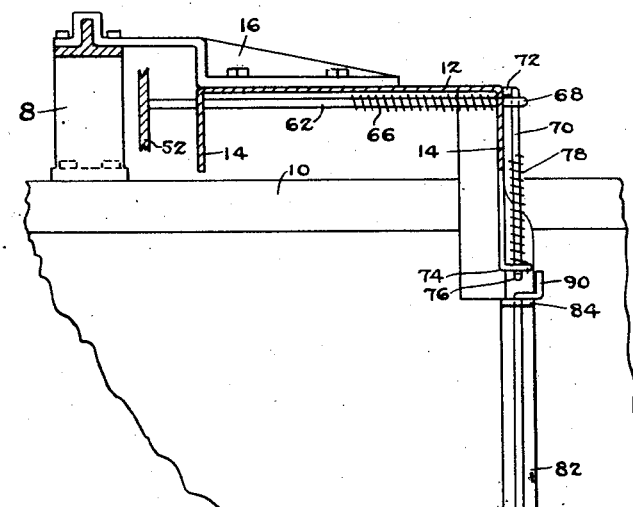
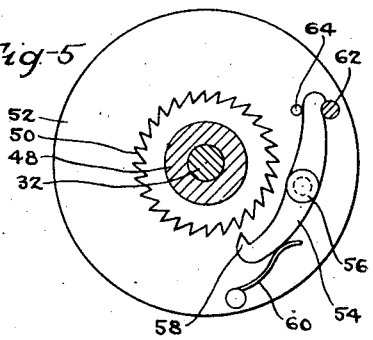
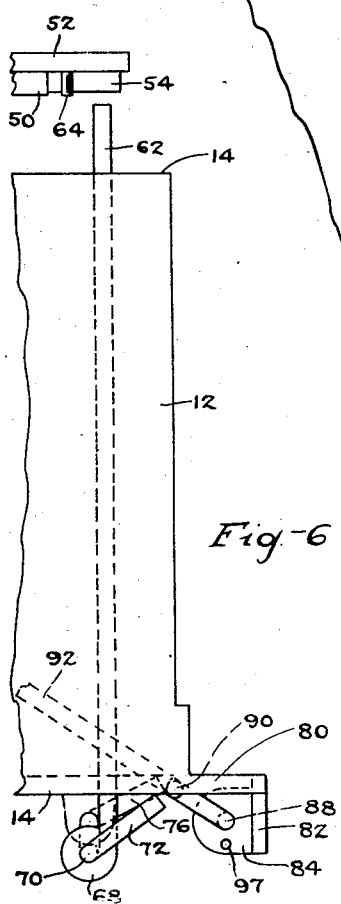
Inventor:
Frank O. Lindgren.
By Whiteley and Ruckman
Attorneys.

Patented Mar. 15, 1932

1,849,238

UNITED STATES PATENT OFFICE

FRANK O. LINDGREN, OF MINNEAPOLIS, MINNESOTA, ASSIGNOR, BY MESNE ASSIGNMENTS, TO GENERAL MILLS, INC., OF MINNEAPOLIS, MINNESOTA, A CORPORATION OF DELAWARE

MACHINE FOR INSERTING CIRCULARS INTO CONTAINERS

Application filed June 29, 1928. Serial No. 289,238.

My invention relates to machines for inserting circulars into containers and an object is to provide mechanism for inserting circulars one at a time in the open upper ends of containers which are being conveyed underneath a stack of circulars. While my machine is intended more particularly for inserting circulars into the open mouth of sacks filled with flour, it is to be understood that it may be employed for inserting circulars into other containers as they are being conveyed.

The full objects and advantages of my invention will appear in connection with the detailed description thereof, and the novel features of my inventive idea will be particularly pointed out in the claims.

In the accompanying drawings which illustrate a practical embodiment of my invention,—

Fig. 1 is a top plan view of a machine with a portion shown in horizontal section. Fig. 2 is a view in vertical section on the line 2—2 of Fig. 1. Fig. 3 is a view corresponding to Fig. 2 but showing some of the parts in a different position. Fig. 4 is a view in vertical section on the line 4—4 of Fig. 1. Fig. 5 is a view in vertical section on the line 5—5 of Fig. 1. Fig. 6 is a fragmentary view corresponding to the upper right hand portion of Fig. 1 but showing some of the parts in a different position.

Since my machine is intended more particularly for use in connection with sack closing machines, I have shown it attached to a standard 8 carried by the frame 10 of a sack closing machine. The machine of my present invention includes a plate 12 having its two opposite sides turned down to form flanges 14. Two angle strips 16 are secured to the plate 12 and these angle strips are in turn secured to the standard 8. It will be understood, however, that the machine may be attached to any suitable support as long as it is held in proper relation above a conveyor belt. The middle portion of the plate 12 is cut out to form an opening 18 which receives two resilient rollers 20 and 22 preferably of rubber and one of them such as the roller 22 preferably being corrugated longitudinally.

The rollers 20 and 22 are provided respectively with shafts 24 and 26 the ends of which have bearings in strips or bars 28 which at one end are pivoted to the outside of the flanges 14 respectively as indicated at 30. The other ends of the strips 28 constitute bearings for a shaft 32 which connects these two strips. The shaft 32 passes through vertical slots 34 formed in the flanges 14. The shaft 32 carries two similar cams 36 which are adapted to engage the bottom of the plate 12 in one position of the cams and are also adapted to engage a cross bar 38 when turned through 180°, it being noted that the cross bar 38 connects the flanges 14. When the cams 36 engage the plate 12, the rollers 20 and 22 are in depressed position as shown in Fig. 2 and when these cams come into engagement with the cross bar 38, the rollers are lifted as shown in Fig. 3. Secured to one end of the shaft 24, there is a pulley 40 which is driven from any suitable source of power. Secured to the other end of the shaft 24 there is a spur gear 42 which meshes with a spur gear 44 secured to the shaft 26. The gear 44 meshes with a spur gear 46 loose on the shaft 32 and the gear 46 has a hub 48 to which a ratchet wheel 50 is secured. Secured to the end of the shaft 32 adjacent the ratchet wheel 50, there is a disk 52 to which a dog 54 is intermediately pivoted at 56. One end of the dog 54 has a tooth 58 adapted to be moved into engagement with the teeth of the ratchet wheel 50 by a spring 60. Normally, however, the dog 54 is held out of engagement with the ratchet wheel as shown in Fig. 5 by one end of a slidable rod 62 which engages the end of the dog opposite the tooth 58 and holds this end in engagement with a pin 64 carried by the disk 52. The rod 62 passes slidably through holes in the flanges 14 and is normally held by a spring 66 in the position shown in Figs. 1 and 5. The other end of the rod 62 is provided with a loop 68 through which a vertical rod 70 passes, the upper end of this rod being bent at right angles to form a crank arm 72. The lower portion of the rod 70 after passing rotatably through a bracket member 74 has its lower end bent at right angles to form a crank arm 76. A coiled spring 78 secured to the bracket member 74 and to the rod 70 tends to hold the latter with its arm 72 against the flange 14 as shown in Fig. 1. A bracket 80 is secured to the front of the plate 12 and a bar 82 extends downwardly from this bracket. The bar 82 is provided with bearings 84 and 86 for a vertical rod 88, the upper end of which is bent to form a crank arm 90 adapted to engage the arm 76 and turn the rod 70 in opposition to the tension of the spring 78. When the rod 70 is thus turned, the upper arm 72 rides on the flange 14 thereby pulling the rod 62 from the position of Figs. 1 and 5 into the position of Fig. 6. This movement is sufficient to disengage the free end of the rod 62 from the dog 54 so that the tooth 58 of the latter is brought into engagement with the teeth of the ratchet wheel 50 by means of the spring 60. The lower end of the rod 88 is provided with a trip arm 92 which is normally held in the outwardly extending position shown in Fig. 1 by a coiled spring 94 secured to the rod 88 and to the lower end of the bar 82. The trip arm 92 is so positioned with relation to a conveyor belt 96 that containers such as sacks S carried thereon in upright position will operate said trip arm as they are passing thereby. The outward movement of the trip arm is limited by a stop pin 97 secured to the bearing 84. All of the springs which are tensioned by movement of the trip arm are sufficiently light so that there is no liability of upsetting the sacks when they engage the trip arm. A holder for the circulars which are to be inserted into the moving sacks is produced by securing a number of upstanding strips 98 near the ends of the opening 18 of the plate 12. The middle ones of the strips 98 at the front and rear ends of the opening 18 are held in place by screws 100 whose heads project up from the plate 12 so that the end portions of circulars C placed in the holder rest upon these screws. In order to apply pressure on top of the circulars a weight is placed thereon. This weight consists of a plate 102 to the middle of which an upstanding member 104 is secured. The ends of the plate 102 are curved as shown in order to hold the ends of the circulars down firmly upon the screws 100 when the rollers are lifted as shown in Fig. 3. The effect of the projecting screw members 100 contacting with the circulars underneath the weight plate 102 is to offer a resistance to the movement of circulars contacting with such screwheads. This resistance is not sufficient to hold back the first circulars engaging the rollers, but the circulars above coming into engagement with the screw-heads after the first circular has been withdrawn and folded are restrained by contact with one or the other of said screw-heads 100.

The operation and advantages of my invention will now be obvious. When the trip arm 92 is not operated by the engagement of sacks therewith, the rollers 20 and 22 rotate freely in the direction of the arrows shown in Fig. 2. When the trip arm is operated by engagement of a sack therewith, the rod 62 is pulled into the position shown in Fig. 6 thereby releasing the dog 54 so that the shaft 32 is caused to make a rotation. The rotation of this shaft brings the cams 36 into engagement with the cross bar 38 thereby swinging the strips 28 upwardly around their pivots 30. This moves the rollers 20 and 22 upwardly so that they have a frictional grip on the lowermost circular C'. The result is that the ends of this circular are pulled off the screws 100. Only one circular at a time is thus pulled since the stack of circulars is held down at the ends by the curved plate 102. The lowermost circular C' feeds down between the rollers 20 and 22, being folded near its middle as shown in Fig. 3. When released by the rollers, this circular drops into the open mouth of the sack S on top of the material therein. The position of the trip arm 92 is such that the sack which causes the tripping action has been advanced to a position underneath the rollers by the time the circular moved downwardly thereby is released. When the sack no longer engages the trip arm, the latter immediately returns to its outstanding position ready for engagement by the next sack. The shaft 32 makes only one rotation and before this rotation is completed, the rod 62 has been released so that its free end returns to the position of Figs. 1 and 5 thereby moving the tooth 58 from engagement with the ratchet wheel 50. As shown in Fig. 5, the end of the rod 62 moves into a slight depression in the dog 54 and this dog engages the pin 64 so that the disk 52 can rotate no further. Overrunning of the disk 52 and shaft 32 to which it is secured is thus prevented.

I claim:

1. A machine for inserting circulars into containers comprising a support, a pair of arm members pivoted to said support, a pair of rollers having bearings in said arm members, a holder for circulars having said rollers disposed at the bottom thereof, a trip device successively engaged and moved by the containers as they are being conveyed underneath said rollers, a normally stationary shaft, mechanism for rotating said shaft set in operation by the movement of said trip device, and mechanism connected with said shaft for swinging said arm members upwardly upon rotation of said shaft to cause said rollers to be lifted and remove the lowermost circular from said holder for insertion in a container.

2. A machine for inserting circulars into containers comprising a support, a pair of arm members pivoted to said support, a pair of rollers having bearings in said arm members, a holder for circulars having said rollers disposed at the bottom thereof, a normally stationary shaft carried by the free ends of said arm members, a trip device successively engaged and moved by the containers as they are being conveyed underneath said rollers, mechanism for rotating said shaft set in operation by the movement of said trip device, and cams carried by said shaft for swinging said arm members upwardly upon rotation of said shaft to cause said rollers to be lifted and remove the lowermost circular from said holder for insertion in a container.

3. A machine for inserting circulars into containers comprising a support, a pair of arm members pivoted to said support, a pair of rollers having bearings in said arm members, a holder for circulars having said rollers disposed at the bottom thereof, gears carried by the shafts of said rollers respectively and meshing with each other, a shaft carried by the free end of said arm members, a gear loose on said shaft and meshing with one of the aforesaid gears, a ratchet wheel fast to said loose gear, a disk secured to said shaft, a dog carried by said disk, a movable member normally holding said dog out of engagement with said ratchet wheel, a trip arm adapted to be successively engaged and moved by the containers as they are being conveyed underneath said rollers, connections between said trip arm and said movable member for moving the latter out of engagement with said dog, and cams carried by said shaft for swinging said arm members upwardly upon rotation of said shaft to cause said rollers to be lifted and remove the lowermost circular from said holder for insertion in a container.

4. A machine for inserting circulars into containers comprising a support, a holder for circulars carried by said support, a pair of rollers mounted for conjoint swinging movement at the bottom of said holder, means for rotating said rollers, a conveyor belt for feeding filled containers underneath said rollers, a trip member normally extending into the path of said containers and operated by the latter, and mechanism set in operation by the movement of said trip member for swinging said rollers upwardly for engaging and delivering circulars from said holder into the open upper ends of said containers.

5. A machine for inserting circulars into containers comprising a support, a pair of arm members pivoted on said support, a rotatable device carried by said arm members, a holder for circulars having said rotatable device disposed at the bottom thereof, a trip device successively engaged and moved by the containers as they are being conveyed, a normally stationary shaft carried by said arm members, mechanism for rotating said shaft set in operation by the movement of said trip device, and mechanism connected with said shaft for swinging said arm members upwardly upon rotation of said shaft to cause said rotatable device to be lifted and remove the lowermost circulars from said holder for insertion in one of said containers.

6. A machine for inserting circulars into containers comprising a support, a pair of arm members pivoted on said support, a rotatable device carried by said arm members, a holder for circulars having said rotatable device disposed at the bottom thereof, a trip device successively engaged and moved by the containers as they are being conveyed, a normally stationary shaft carried by said arm members, mechanism for rotating said shaft set in operation by the movement of said trip device, and a cam device carried by said shaft for swinging said arm members upwardly upon rotation of said shaft to cause said rotatable device to be lifted and removed the lowermost circular from said holder for insertion in one of said containers.

7. A machine for inserting circulars into containers comprising a support, a pair of arm members pivoted on said support, a rotatable device carried by said arm members, a holder for circulars having said rotatable device disposed at the bottom thereof, a shaft carried by the free end of said arm members, a gear loose on said shaft, means for rotating said gear, a ratchet wheel fast to said loose gear, a disk secured to said shaft, a dog carried by said disk, a movable member normally holding said dog out of engagement with said ratchet wheel, a trip member adapted to be successively engaged and moved by the containers as they are being conveyed, connections between said trip member and said movable member for moving the latter out of engagement with said dog, and a cam device carried by said shaft for swinging said arm members upwardly upon rotation of said shaft to cause said rotatable device to be lifted and remove the lowermost circular from said holder for insertion in one of said containers.

8. A machine for inserting circulars into containers comprising a support, a holder for circulars carried by said support, a rotatable device mounted for swinging movement at the bottom of said holder, means for rotating said rotatable device, a conveyor belt for feeding containers, a trip member normally extending into the path of said containers and operated by the latter, and mechanism set in operation by the movement of said trip member for swinging said rotatable device upwardly for engaging and removing the lowermost circular from said holder for insertion into the open upper ends of said containers in succession.

In testimony whereof I hereunto affix my signature.

FRANK O. LINDGREN.